Patented Mar. 28, 1933

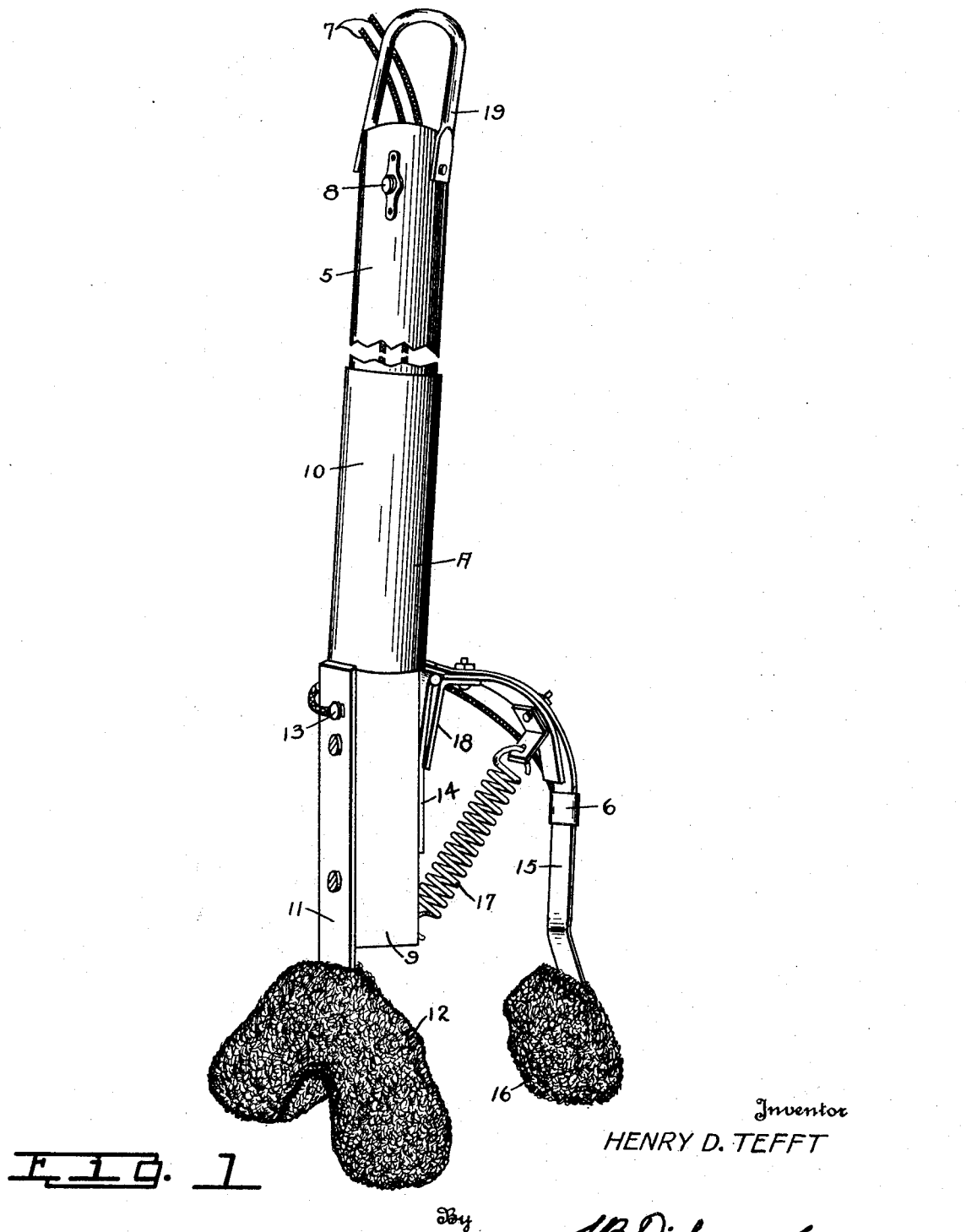

1,902,901

UNITED STATES PATENT OFFICE

HENRY DELANO TEFFT, OF CHICAGO, ILLINOIS

ELECTRICAL STUNNING DEVICE

Application filed January 21, 1932. Serial No. 588,015.

This invention relates to novel devices for stunning animals in abattoirs.

It has long been the custom in slaughter houses to drive the animals, to be killed, one at a time to the stunning pen, where they were knocked down and temporarily stunned by the use of a sledge hammer or similar instrument in the hands of a workman particularly skilled in the practice. After the stunning process, the rear legs of the animals are shackled and the animals are hoisted on to the sticking rails.

Therefore, it is one of the primary objects of my invention to provide a novel and effective means for electrically stunning the animals in a humane manner, one in which the animals can be quickly rendered insensible with the expenditure of a minimum amount of time and effort.

Another salient object of my invention is the provision of an electrically stunning appliance for animals, one which is light and can be easily handled by a layman and applied to an animal's head without danger to the operator.

A further object of my invention is the provision of an electrically stunning appliance having two points of contact, the contacts being so arranged that they can be soaked as one without danger of short circuiting.

A further object of my invention is the provision of an electrically stunning appliance which may be applied to the animal's head without the animal seeing the operator.

A further object of my invention is the provision of an electrical stunning appliance embodying an operating handle having a rigid and a pivoted electrode, with means for normally swinging the pivoted electrode toward the rigid electrode so as to insure the proper engagement of the electrodes with the animal's head, the swinging electrode also allowing the device to be readily associated with the heads of different sized animals.

A further object of my invention is the provision of an electrical stunning appliance so constructed as to enable the proper pressure to be applied during the stunning process and to insure positive contact with the animal's head.

A still further object of my invention is the provision of an electrical stunning device of the above character which will be durable and efficient and one which can be manufactured and placed upon the market at a reasonable cost.

With these and other objects in view the invention consists in the novel construction and arrangement of parts, as will be hereinafter more fully described and claimed, and illustrated in the accompanying drawing, in which drawing:—

Figure 1, the figure being a perspective view of my improved stunning device.

Referring to the drawing in detail, the letter A generally indicates my improved stunning device, which comprises an elongated handle 5, formed of wood or other insulating material. The handle is provided with a longitudinal bore, through which extend the line wires 7, leading from any desired source of electrical energy. A switch 8 is carried by the handle and is interposed in the line wires for controlling the flow of current therethrough.

An insulation block 9 is provided at the lower end of the handle, and this block is solid and can be formed of hard rubber if so desired, or any other suitable insulating material such as impregnated wood. The handle 5 and the insulating block 9 are joined by a flexible connection 10 interposed between them, and this flexible connection can be of any suitable resilient material. This flexible connection has one end rigidly secured to the handle 5, the other end being rigidly secured to the block 9, and this connection as shown in the drawing is of resilient rubber. By providing such resilient means, the operator can apply the electrodes to the animal's head when it is in an unfavorable location.

Bolted or otherwise secured to the block 9 is a current conducting metal strap 11, and this strap forms a part of one electrode and extends beyond the block. The outer end of the metal strap 11 carries an arch shaped pad 12 formed of fibrous or spongy material susceptible of holding moisture and this pad forms means for engaging the animal's head at the base of the skull. One of the wires 7 is electrically connected to the strap 11, as shown at 13.

On the other side of the block 9 from the strap 11 is a bracket 14 to which is connected by means of a hinge pin, a swinging arcuate current-conducting arm 15, which forms a part of the other electrode. This arm 15 has secured to its lower free end a pad 16 formed of fibrous or spongy material, and this pad is adapted to engage the forehead of the animal to be stunned. The other current conducting wire is secured to the arm by means of a clip 6.

In order to tension the forehead electrode, a contractile coil spring 17 is connected therewith and the block of insulation 9. Rigidly secured to the inner end of the arm 15 is an angle shaped stop bracket 18, which is adapted to abut the block of insulation 9 to limit the inward swinging movement of the arm and thereby prevent the contacting of the pad 16 with the pad 12.

A bale shaped loop 19 can be pivotally connected to the rear end of the handle to permit the device to be hung up, or a cable or rope (not shown) one end of which may be connected to the bale, the other end to a counter weight, the cable or rope being trained over suitable guide pulleys. It is obvious that the stunning device with the latter arrangement, when not in use will be suspended in a convenient position over the stunning pen for the operator, and that after the operator has used the stunner, the same will automatically assume its suspended position due to the counter weight.

In use of my improved device, the pads 12 and 16 are dipped in a brine solution, in order to permit a good contact to be had with the head of the animal. The arch shaped pad 12 is then placed on the top of the animal's head at the base of the brain and the pad 16 on the animal's forehead. The switch 8 is now closed and the flow of current will be such as to immediately stun the animal.

In actual practice the head of the animal is held in a raised position by a chain against movement and the device can be used in connection with my animal stunning pen disclosed in my allowed application Serial #496,359. filed November 17, 1930. By holding the head of the animal up by a chin strap, it has been found that all tendency of the animal's back to arch is eliminated, also the application of the current to the forehead and base of the skull prevents the breaking or arching of the animal's back.

From the foregoing description it can be seen that I provide a unitary structure in which the two points of contact are applied to the head of the animal simultaneously by a single operator, and also the electrodes likewise as a unit can be immerged into a brine solution in one operation.

Changes in details may be made without departing from the spirit or scope of this invention, but:—

What I claim is:—

1. A device for stunning animals electrically, comprising an operating handle, an arcuated skull engaging electrode on the handle, and a movable forehead engaging electrode on the handle.

2. A device for stunning animals electrically, comprising an operating handle, an arcuated skull engaging electrode on the handle, a movable forehead engaging electrode on the handle, spring means interposed between the handle and the movable electrode, one of said electrodes being normally urged toward the other.

3. A device for stunning animals electrically, comprising an operating handle, a rigid electrode secured to the handle having a skull engaging pad of arch shape, a swinging electrode secured to the handle having a flat forehead engaging pad, and spring means normally urging the swinging electrode toward the rigid electrode.

4. A device for stunning animals electrically, comprising an operating handle, a rigid electrode secured to the handle having a skull engaging pad of an arch shape, a swinging electrode secured to the handle having a flat forehead engaging pad, said pad extending beyond one end of the handle, spring means for normally urging the swinging electrode toward the rigid electrode, and means for limiting the swinging movement of the movable electrode toward the rigid electrode.

5. A device for stunning animals electrically, comprising an operating handle, a solid block of insulation on one end of the handle, a metal strap secured to one side of the block and projecting beyond the same, a swinging conductor arm hinged to the other side of the block and projecting beyond the same, said arm being of an arcuate shape, pads carried by the strap and arm, a coil spring connecting said arm and block, means for limiting the swinging movement of said arm, current conductor wires carried by the handle, and means connecting the wires to the strap and arm.

In testimony whereof, I affix my signature.

HENRY DELANO TEFFT.